(12) United States Patent
Yun et al.

(10) Patent No.: US 11,086,544 B2
(45) Date of Patent: Aug. 10, 2021

(54) AUTONOMOUS DRIVING CONTROL APPARATUS, VEHICLE HAVING THE SAME AND METHOD FOR CONTROLLING THE VEHICLE

(71) Applicants: HYUNDAI MOTOR COMPANY, Seoul (KR); KIA MOTORS CORPORATION, Seoul (KR)

(72) Inventors: HyunChul Yun, Seoul (KR); JiWon Kwon, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 435 days.

(21) Appl. No.: 16/158,549

(22) Filed: Oct. 12, 2018

(65) Prior Publication Data

US 2019/0384522 A1   Dec. 19, 2019

(30) Foreign Application Priority Data

Jun. 19, 2018   (KR) .......................... 10-2018-0069988

(51) Int. Cl.
  *G06F 3/06* (2006.01)
  *G05D 1/00* (2006.01)
  *B60R 16/023* (2006.01)

(52) U.S. Cl.
  CPC .......... *G06F 3/0647* (2013.01); *B60R 16/023* (2013.01); *G05D 1/0088* (2013.01); *G05D 2201/0213* (2013.01)

(58) Field of Classification Search
  CPC .... G06F 3/0647; G06F 3/0635; G06F 3/0617; G06F 3/0688; G06F 3/0649;
  (Continued)

(56) References Cited

U.S. PATENT DOCUMENTS 6,629,191 B1   9/2003   Katayama et al.
8,582,358 B2   11/2013  Takeyama et al.
(Continued)

FOREIGN PATENT DOCUMENTS

JP   2013-024117 A   2/2013
JP   2014-081825 A   5/2014

OTHER PUBLICATIONS

Becker, Matthias et al., "*Investigation on AUTOSAR-Compliant Solutions for Many—Core Architectures*" 2015 Euromicro Conference on Digital System Design, IEEE Xplore Oct. 26, 2015; Electronic ISBN 978-1-4673-8035-5, 9 pp.

*Primary Examiner* — Thomas Ingram
(74) *Attorney, Agent, or Firm* — Brinks Gilson & Lione

(57) ABSTRACT

A vehicle includes electronic control units (ECUs) to control devices and functions of the vehicle, domain control units (DCUs) to group the ECUs by domain and manage the groups of the ECUs by domain, and a connectivity control unit (CCU) to communicate with the DCUs and an external device. Each of the ECUs includes a memory to store data and software and a processor to generate a control signal to control a device or a function based on the data and software. The DCU determines whether an ECU is available to store new data based on at least one of a remaining capacity and an available level of a memory of the ECU, and when the ECU is unavailable to store the new data, the DCU selects other memory of the ECUs managed by other DCU as an alternative memory, and store the new data in the alternative memory.

15 Claims, 11 Drawing Sheets

(58) Field of Classification Search
CPC ......... G05D 1/0088; G05D 2201/0213; G05D 1/0077; G05D 1/021; B60R 16/023; B60R 16/0232; B60W 50/0098; B60W 2050/0005; B60W 2050/0006; B60W 60/00; G07C 5/008; G07C 5/085
See application file for complete search history.

(56) References Cited

U.S. PATENT DOCUMENTS

| | | |
|---|---|---|
| 8,909,850 B2 | 12/2014 | Sopko et al. |
| 9,817,768 B2 | 11/2017 | Ueda et al. |
| 2013/0332695 A1* | 12/2013 | Katori ................. G06F 12/0238 711/172 |
| 2014/0343787 A1* | 11/2014 | Mabuchi ................. G06F 21/64 701/31.7 |
| 2019/0278661 A1* | 9/2019 | Mehta ................. G06F 11/1451 |

* cited by examiner

FIG. 7A

| CANDIDATE | TOTAL MEMORY STORAGE CAPACITY | OCCUPANCY RATIO | MAXIMUM USAGE RATIO | REMAINING CAPACITY | PRIORITY |
|---|---|---|---|---|---|
| ECU5 | 8Mbyte | 60% | 65% | 2.8M | 1 |
| ECU6 | 4Mbyte | 50% | 60% | 1.6M | 3 |
| ECU7 | 6Mbyte | 50% | 55% | 2.7M | 2 |

FIG. 7B

| CANDIDATE | ACTUAL USAGE TIMES | MAXIMUM USAGE TIMES | WARNED LEVEL (Warning 80%) | LIMITED LEVEL (Limitation 90%) | PRIORITY |
|---|---|---|---|---|---|
| ECU5 | 5 TIMES | 10 TIMES | - | - | 1 |
| ECU6 | 16 TIMES | 20 TIMES | ◯ | - | 2 |
| ECU7 | 9 TIMES | 10 TIMES | ◯ | ◯ | 3 |

AUTONOMOUS DRIVING CONTROL APPARATUS, VEHICLE HAVING THE SAME AND METHOD FOR CONTROLLING THE VEHICLE

CROSS-REFERENCE TO RELATED APPLICATION

This application claims priority to and the benefit of Korean Patent Application No. 10-2018-0069988, filed on Jun. 19, 2018, the entire contents of which are incorporated herein by reference in its entirety.

FIELD

The present disclosure relates to an autonomous driving control apparatus, vehicle having the same, and method for controlling the vehicle.

BACKGROUND

The statements in this section merely provide background information related to the present disclosure and may not constitute prior art.

Vehicles are machines running on the road by driving their wheels and equipped with various devices for protecting people on board, assisting in driving and giving smooth rides.

In addition to the basic driving functions, the vehicle further provide various user-convenient functions, such as audio play, video play, navigation, Air Conditioning (AC) and ventilation, seat control, lighting control, etc.

The vehicle may have an audio video navigation (AVN) device in which the navigation, audio play and video play functions are incorporated.

A navigation mode for performing the navigation function is to guide the user to a destination along a route by receiving position information from satellites with many Global Positioning System (GPSs), calculating a current location of the vehicle, displaying the current location on a map by map matching, calculating the route from the current location to the destination according to a preset route finding algorithm when the user inputs the destination, and matching and displaying the route on the map.

The vehicle includes an autonomous driving control apparatus that performs autonomous driving to a destination by using navigation, lane detection, and obstacle detection functions.

SUMMARY

The present disclosure provides an autonomous driving control apparatus, vehicle having the same, and method for controlling the vehicle, which enables another electronic control unit to store data for autonomous driving control as an amount of the data for autonomous driving control increases.

The present disclosure also provides a vehicle and method for controlling the same, which separates and groups a plurality of electronic control devices by domain and manages the plurality of electronic control devices using a domain control unit for each group.

The present disclosure also provides an autonomous driving control apparatus, vehicle having the same, and method for controlling the vehicle, which enables data stored in a memory of other electronic control unit to be deleted based on the importance of the data when new data for autonomous driving control is to be stored in the other electronic control device.

In accordance with an aspect of the present disclosure, an autonomous driving control apparatus is provided. The autonomous driving control apparatus includes a plurality of electronic control units (ECUs) coupled to a plurality of devices, where each ECU of the plurality of ECUs is configured to control operation of a corresponding device of the plurality of devices;; and a domain control unit (DCU) configured to communicate with the plurality of ECUs and an external device, wherein: each ECU of the plurality of ECUs comprises: a memory configured to store data and software for autonomous driving, and a processor configured to generate and output a control signal to control operation of the corresponding device of the plurality of devices based on the stored data and software, wherein when new data is received from the external device, the DCU is configured to: select a first ECU of the plurality of ECUs to store the new data, determine whether the first ECU is available to store the new data based on at least one of a remaining capacity of a memory of the first ECU or an available level of the memory of the first ECU, and wherein when it is determined that the first ECU is unavailable to store the new data, the DCU is configured to: select a memory of a second ECU of the plurality of ECUs, and store the new data in the memory of the second ECU of the plurality of ECUs.

The DCU may, when the remaining capacity of the memory of the first ECU is equal to or greater than a volume of the new data and the available level of the memory of the first ECU is not a limited level, control the new data to be stored in the memory of the first ECU.

The DCU may, when the remaining capacity of the memory of the first ECU is less than a volume of the new data, control the selection of a memory of other ECUs of the plurality of ECUs, and when the available level of the memory of the first ECU is a limited level, control selection of a memory of other ECUs of the plurality of ECUs.

The DCU may receive remaining capacities and available levels of memories of the other ECUs of the plurality of ECUs, determine priorities of the memories of the other ECUs based on the remaining capacities and available levels of the memories of the other ECUs, and select the memory of the second ECU based on the priorities of the memories of the other ECUs.

In accordance with another aspect of the present disclosure, a vehicle is provided. The vehicle includes a plurality of electronic control units (ECUs) configured to control a plurality of devices and functions; a plurality of domain control units (DCUs) configured to group the plurality of ECUs by a domain and manage the plurality of ECUs; and a connectivity control unit (CCU) configured to communicate with the plurality of DCUs and an external device, wherein: each ECU of the plurality of ECUs comprises: a memory configured to store data and software, and a processor configured to generate and output a control signal to control a device or a function based on the stored data and software, wherein the CCU is configured to: determine a first ECU of the plurality of ECUs to store new data when the new data is received from the external device, and send the new data to a first DCU of the plurality of DCUs configured to manage a first ECU of the plurality of ECUs, and wherein the first DCU configured to receive the new data and determine whether the first ECU is available to store the new data based on at least one of a remaining capacity of a memory of the first ECU or an available level of the memory of the first ECU, and wherein when it is determined that the first ECU is unavailable to store the new data, the first DCU is configured to select a memory of a second ECU of the plurality of ECUs managed by a second DCU, and store the new data in the memory of the second ECU.

When the remaining capacity of the memory of the first ECU is equal to or greater than a volume of the new data and the available level of the memory of the first ECU is not a limited level, the first DCU is configured to control the new data to be stored in the memory of the first ECU.

When the available level of the memory of the first ECU is a limited level, the first DCU is configured to control selection of a memory of other ECUs of the plurality of ECUs.

The plurality of DCUs may send remaining capacities and available levels of memories of the plurality of ECUs to the CCU when receiving a request to provide memory information from the CCU.

The first DCU receiving the new data may receive the remaining capacities and available levels of memories of the plurality of ECUs managed by a corresponding DCU of the plurality of DCUs, determine priorities of the memories of the plurality of ECUs based on the remaining capacities and available levels of the memories of the plurality of ECUs, and select the memory of the second ECU of the plurality of ECUs based on the priorities.

The first DCU receiving the new data may delete data stored in the memory of the second ECU when an importance of the data stored in the memory of the second ECU is lower than a threshold importance.

The CCU may send at least one of information about storage of the new data, information about the memory of the second ECU, or information about deletion of the data stored in the memory of the second ECU to the external device.

The first DCU may receive a total storage capacity, an occupancy ratio, and a maximum usage ratio of a memory of the first ECU from the first ECU, and obtain the remaining capacity of the memory of the first ECU based on the total storage capacity, the occupancy ratio, and the maximum usage ratio of the memory of the first ECU.

Each DCU of the plurality of DCUs may determine maximum usage times of each memory of the plurality of ECUs based on maximum usage times for each class stored in each memory of the plurality of ECUs, determine actual usage times of each memory of the plurality of ECUs, and obtain an available level of each memory of the plurality of ECUs based on the maximum usage times and the actual usage times of each memory of the plurality of ECUs.

Each DCU of the plurality of DCUs may generate and store a first lookup table having a total storage capacity, an occupancy ratio, a maximum usage ratio, and a remaining capacity of each memory of the plurality of ECUs managed, and generate and store a second lookup table having maximum usage times, actual usage times, and an available level of each memory of the plurality of ECUs.

Another DCU of the plurality of DCUs may send the first lookup table and the second lookup table to the first DCU or the second DCU receiving the new data through the CCU.

The plurality of DCUs may manage at least one ECU of the plurality of ECUs which is configured to control a user-convenient function and a user-convenient device.

In accordance with another aspect of the present disclosure, a method for controlling a vehicle is provided. The method includes managing, by a first domain control unit (DCU), memories of a first plurality of electronic control units (ECUs) that is grouped into a first domain so as to form a first ECU group; managing, by a second DCU, memories of a second plurality of ECUs grouped into a second domain so as to form a second ECU group; when new data to be stored in a memory of an ECU of the first ECU group managed by the first DCU is received, determining, by the first DCU, a remaining capacity and an available level of the memory of the ECU of the first ECU group to store the new data; determining, by the first DCU, whether the ECU of the first ECU group is available to store the new data based on the remaining capacity and the available level of the memory of the ECU of the first ECU group; storing the new data in the memory of the ECU of the first ECU group when it is determined that the ECU of the first ECU group is available to store the new data; when it is determined that the ECU of the first ECU group is unavailable to store the new data, selecting a memory of an ECU of the second ECU group managed by the second DCU to be an alternative memory; storing the new data in the alternative memory; and sending information about the storing of the new data to an external device.

The determining of whether the ECU of the first ECU group is available to store the new data may include: when the remaining capacity of the memory of the ECU of the first ECU group is equal to or greater than a volume of the new data and the available level of the memory of the ECU of the first ECU group is not a limited level, determining that the ECU of the first ECU group is available to store the new data; when the remaining capacity of the memory of the ECU of the first ECU group is less than the volume of the new data, determining that the ECU of the first ECU group is unavailable to store the new data; and when the available level of the memory of the ECU of the first ECU group is a limited level, determining that the ECU of the first ECU group is unavailable to store the new data.

The selecting of an alternative memory may include: determining remaining capacities and available levels of the memories of the second ECU group managed by the second DCU; determining priorities of the memories of the second ECU group based on the remaining capacities and available levels of the memories of the second ECU group; and selecting the alternative memory in the second ECU group based on the priorities.

The method may further include, when there are two or more memories having a same remaining capacity among the memories of the second ECU group managed by the second DCU, determining priorities of the two or more memories based on available levels of the two or more memories of the second ECU group.

The managing memories of the plurality of ECUs of the first ECU group and the second ECU group by the first DCU or the second DCU may include: obtaining remaining capacities of the memories of the plurality of ECUs of the first ECU group and the second ECU group based on a total storage capacity, an occupancy ratio, and a maximum usage ratio of each memory of the plurality of ECUs of the first ECU group and the second ECU group; generating and storing a first lookup table having a total storage capacity, an occupancy ratio, a maximum usage ratio, and a remaining capacity of each memory of the plurality of ECUs of the first ECU group and the second ECU group; determining maximum usage times of each memory of the plurality of ECUs of the first ECU group and the second ECU group based on the maximum usage times for each class stored in each memory of the plurality of ECUs of the first ECU group and the second ECU group; determining actual usage times of each memory of the plurality of ECUs of the first ECU group and the second ECU group; obtaining an available level of each memory of the plurality of ECUs of the first ECU group and the second ECU group based on the maximum usage times and the actual usage times of each memory of the plurality of ECUs of the first ECU group and the second ECU group; and generating and storing a second lookup table having maximum usage times, actual usage times, and an available level of each memory of the plurality of ECUs of the first ECU group and the second ECU group.

The method may further include managing, by the first DCU, the memories of the first plurality of ECUs of the first ECU group configured to control a device and a function thereof related to autonomous driving control; and managing, by the second DCU, the memories of the second plurality of ECUs of the second ECU group configured to control a device and a function thereof related to a user convenience.

The method may further include when an available capacity of the alternative memory is less than a volume of the new data, determining an importance of data stored in the alternative memory; when the importance of the data is lower than a threshold importance, deleting the data stored in the alternative memory; and storing the new data in the alternative memory.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 7A and 7B show first and second lookup tables created by a domain control unit of a vehicle control apparatus.

Figure 1:
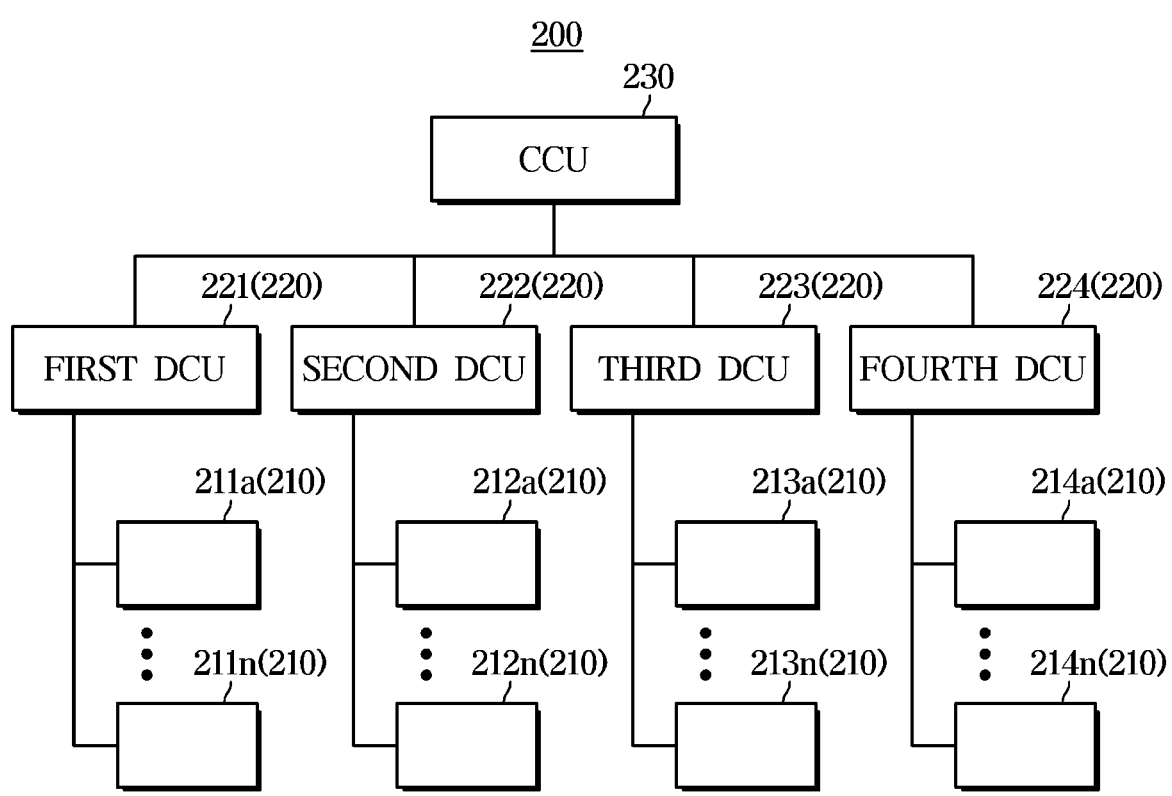
FIG. 1 is a control block diagram of a vehicle equipped with an autonomous driving control apparatus.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Not all elements of forms of the present disclosure will be described, and description of what are commonly known in the art or what overlap each other in the forms will be omitted. The term "unit" as herein used may be implemented in software or hardware.

It will be further understood that the term "connect" or its derivatives refer both to direct and indirect connections, and the indirect connection includes a connection over a wireless communication network.

The term "include (or including)" or "comprise (or comprising)" is inclusive or open-ended and does not exclude additional, unrecited elements or method steps, unless otherwise mentioned.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are just used for convenience of explanation, but not to limit an order of the steps. Thus, unless the context clearly dictates otherwise, the written order may be practiced otherwise.

Forms of the present disclosure will now be described with reference to accompanying drawings.

A vehicle includes a body with exterior and interior parts, and remaining parts, i.e., chassis on which mechanical devices desired for driving are installed.

The exterior part further includes lamps for enabling the driver to catch information in the neighborhood while keeping his/her eyes forward and perform signaling and communication for other vehicles and pedestrians, and side mirrors for allowing the driver to see a rear view of the vehicle.

The exterior part further includes an antenna for receiving signals from Global Positioning System (GPS) satellites, broadcasting stations, etc., and performing vehicle to everything (V2X) communication such as vehicle to vehicle (V2V) communication and vehicle to infrastructure (V2I) communication over a wireless network for vehicle.

Seats may be equipped with at least one of hot wires for generating heat and ventilation devices for circulating air inside the seats.

A cluster may further include a display for displaying driving information and malfunction information of the vehicle. The driving information may include information about fuel efficiency, distance to empty (DTE), total distance traveled, and driving mode, and the malfunction information may include information about inadequate tire air pressure, for example.

A center fascia may have a head unit installed to control the radio, audio, and AC systems, and a multi-terminal arranged near the head unit and including a Universal Serial Bus (USB) port, an auxiliary (AUX) terminal, and an optional Secure Digital (SD) slot.

The multi-terminal may also enable communication with a user terminal via the USB port. The user terminal may be a portable communication device including a smart phone, a notebook, a tablet, a wearable device, etc.

The vehicle may further include an input device for receiving commands to operate various functions.

The vehicle may further include a display installed in the head unit for displaying information about an activated function and information input by the user.

For example, the display may display information about selection and/or operation of an autonomous driving mode, and/or selection and/or operation of an expressway driving mode.

The display may be implemented by a Plasma Display Panel (PDP), a Liquid Crystal Display (LCD) panel, an Electro Luminescence (EL) panel, an Electrophoretic Display (EPD) panel, an Electrochromic Display (ECD) panel, a Light Emitting Diode (LED) panel, an Organic Light Emitting Diode (OLED) panel, or the like, without being limited thereto.

The vehicle terminal included in the vehicle may receive information about radio mode, audio mode, video mode, Digital Multimedia Broadcasting (DMB) mode, navigation mode, expressway driving mode, and/or autonomous driving mode and display information about an activated function.

The vehicle terminal may also display an image of front, back, left and right views while in the autonomous driving mode and display map information and route guidance information.

The vehicle terminal may be detachably installed on the dashboard or embedded in the center fascia.

The display of the vehicle terminal may also display information about a function being performed and information input by the user.

The vehicle may further include a speaker for outputting many different electronic messages, sound output from the vehicle terminal, sound output from an external device connected to the multi-terminal.

When the vehicle is an internal combustion engine vehicle, the power system includes a power generator and a power transmitter. The power generator generates mechanical power by burning oil fuel such as gasoline and diesel and may include an engine, a fueling device, a cooling device, and an oiler, and the power transmitter transmits output power of the engine to the wheels and may include a clutch, a transmission, a final reduction gear, and a differential gear.

When the vehicle is an electric vehicle, the power system may include a motor, an inverter, a battery, and a reduction gear.

When the vehicle is a hybrid vehicle, the power system may include an engine that burns oil fuel, such as gasoline and diesel to generate mechanical power and transmits the power to the clutch, a battery that produces power with high-tension current and supplies the power to a motor, a generator, and various kinds of electric devices in the vehicle, a motor that generates turning force (also called rotational power) using electric energy from the battery and delivers the turning force to drive the car wheels, a generator that operates as an electricity generator by the power delivered from the engine so that the battery may be recharged, an inverter that converts the power from the battery to driving power for the motor, and an optional battery manager that manages the state of charge (SOC) of the battery, and may further include a clutch, a transmission, a final reduction gear, and a differential gear that transmit output of the engine or motor to the car wheels.

The vehicle may further include user convenience devices.

In summary, the vehicle may include an opening/closing device, an AC, a radio system, an AVN (also referred to as the vehicle terminal), heat wires for seats, air ventilation for seats, heat wires for steering wheel, a vehicle black box, a communication device between the vehicle and a user terminal.

The vehicle may further include various safety systems for safety of the driver and passengers.

The safety systems may include an airbag control unit for the purpose of the safety of driver and passengers in case of car crashes, an Electronic Stability Control (ESC) unit for stabilizing the vehicle's position while the vehicle is accelerating or cornering, an anti-collision system for warning a possibility of collision, a lane departure warning system for warning lane departure, and various kinds of safety systems, such as a tire pressure monitoring system (TPMS) for monitoring air pressure of tires and outputting the monitored result.

Furthermore, the vehicle may include at least one of ultrasound sensor, image sensor, laser sensor, and Light Detection and Ranging (LiDAR) sensor, each of which may substitute for the human vision, and an autonomous driving control apparatus that enables autonomous driving without intervention of the driver by collecting information relating to the driving of the vehicle and detecting objects such as obstacles in front by means of the at least one sensor.

The autonomous driving control apparatus may prevent accidents by supporting the driver's awareness of road conditions even if it is not likely for the driver to be accurately aware of the road condition due to the driver's carelessness, mistake, and vision limitations.

In one form of the present disclosure, the autonomous driving control apparatus may have a highway driving assist (HDA) function that enables the vehicle to be automatically driven only when the vehicle is on the highway.

The vehicle may further include an image acquirer for acquiring surrounding images of a road.

The image acquirer may be a camera including a charge coupled device (CCD) or complementary metal-oxide semiconductor (CMOS) image sensor or three dimensional (3D) spatial awareness sensor such as KINECT (RGB-D sensor), TOF (structured light sensor), stereo camera, etc.

The image acquirer may be provided in the vehicle black box or in the autonomous driving control apparatus, or may be intended for obstacle detection, or may be provided in the lane departure warning system.

The image acquirer may be mounted on the front window glass to face the outside of the vehicle, or may be mounted on the room mirror inside the vehicle to face the outside of the vehicle, or may be mounted on the roof panel as being exposed to the outside.

The image acquirer may include at least one of a front camera to capture an image of a view in front of the vehicle, left and right cameras to capture images of views on the left and right sides of the vehicle, and a rear camera to capture an image of a rear view of the vehicle.

The vehicle may further include a distance detector for detecting a distance to an obstacle.

The distance detector may be provided at each of the front, back, left, and right sides of the exterior of the vehicle. The distance detector 150 mounted at each side may include a plurality of sensors.

The distance detector includes a LiDAR sensor.

The LiDAR sensor is a contactless distance detection sensor using a laser radar principle.

The distance detector may also include an ultrasound sensor or a radar sensor.

The vehicle may further include a position receiver (not shown) that receives information about a location of the vehicle to recognize its location. The position receiver may include a GPS receiver that communicates with a plurality of satellites and calculates the location of the vehicle.

The vehicle may further include a speed detector (not shown) for detecting the driving speed of the vehicle. The speed detector may be a wheel speed sensor mounted in the car wheel or an acceleration sensor for detecting acceleration of the vehicle.

Furthermore, the vehicle may include an angular velocity detector for detecting angular velocity of the steering wheel to calculate a steering angle of the vehicle and a yaw rate detector for detecting a yaw moment of the vehicle.

The vehicle may further include an illumination detector for detecting a light condition of the outside of the vehicle, an outside temperature detector for detecting outside temperature of the vehicle, and an inside temperature detector for detecting inside temperature of the vehicle.

These many different kinds of devices equipped in the vehicle may be considered loads of the vehicle that consume the power supplied and provide an output under the control of an electronic control unit (ECU).

FIG. 1 is a block diagram of a vehicle control unit 200 of a vehicle equipped with an autonomous driving control apparatus in one form of the present disclosure.

The vehicle includes a plurality of ECUs 210, a domain control unit (DCU) 220, and a connectivity control unit (CCU) 230.

Each of the plurality of ECUs 210 are electrically, mechanically, and/or communicatively coupled to at least one of the plurality of devices equipped in the vehicle for controlling operation of the at least one device based on a command to perform at least one function.

The plurality of devices may include an acquirer for acquiring information desired to perform the function and an output device for performing the at least one function.

For example, the acquirer may include various detectors and image acquirers, and the output device may include a speaker, a display, a fan and compressor of the AC, an engine and motor of the power system, a motor and valve of the braking system, a fan of the wind ventilation system, an opening/closing system of the doors or tailgate, lamps, an AVN, etc.

The plurality of ECUs may communicate with the acquirer and output device by using at least one of controller area network (CAN) communication, Ethernet, low-voltage differential signal (LVDS) communication, and local connect network (LIN) communication.

The ECUs may determine whether to perform a function based on information acquired through the acquirer, and if it is determined to perform the function, control the operation of the output device that performs the function, especially an amount of operation based on the acquired information.

The ECUs may also control the operation of the output device that performs the function based on a command to perform the function, which is input through the input device, or may check settings corresponding to the information input through the input device and control the operation of the output device based on the settings.

Each ECU may control a function separately or in conjunction with another ECU.

For example, an ECU of the anti-collision system may control the speaker to output a warning sound about a possible collision with an obstacle when a distance to the obstacle detected by the distance detector is within a threshold range.

An ECU of the autonomous driving control apparatus may cooperate with an ECU of the vehicle terminal, an ECU of the image acquirer, and an ECU of the anti-collision system to perform autonomous driving by receiving navigation information, road image information, and information about a distance to an obstacle and controlling the power system, braking system, and steering system based on the received information.

The domain control unit 220 may be electrically, mechanically and communicatively coupled to a plurality of ECUs grouped into the same or similar domain and integrally manage the plurality of ECUs grouped into the same or similar domain.

The DCU 220 may be able to communicate with a plurality of ECUs in a group through CAN communication. The CAN communication may include at least one of low-speed CAN, high-speed CAN, and CAN-Flexible Data rate (CAN-FD) faster than the high-speed CAN.

The domain control unit 220 may be provided in the plural inside the vehicle.

For example, the number of DCUs may be determined depending on the number of domains when a plurality of ECUs equipped in the vehicle are grouped by domain.

There may be two or more DCUs, and in forms of the present disclosure, it is assumed that there are four DCUs 221, 222, 223, and 224.

The plurality of DCUs may be different from one another.

The same or similar domain refers to the same or similar attribute, the same or similar purpose, or the same or similar installation location.

For example, a first domain may correspond to autonomous driving, a second domain corresponds to convenience, a third domain may correspond to the vehicle interior, and a fourth domain may correspond to power train (i.e., a power system). In addition, there may be an extra domain of safety.

For example, the plurality of DCUs may include a first DCU 221 for integrally managing a plurality of ECUs 211a-211n that control operation of many different devices to perform autonomous driving, a second DCU 222 for integrally managing a plurality of ECUs 212a-212n that control operation of many different devices to provide conveniences for the user, a third DCU 223 for integrally managing a plurality of ECUs 213a-213n that control operation of many different devices installed in the interior of the vehicle to receive and indicate various user information, and a fourth DCU 224 for integrally managing a plurality of ECUs 214a-214n that control operation of many different devices to generate and transmit power for the vehicle.

The first DCU 221 manages memories of the plurality of ECUs 211a-211n grouped into the first group of the first domain, the second DCU 222 manages memories of the plurality of ECUs 212a-212n grouped into the second group of the second domain, the third DCU 223 manages memories of the plurality of ECUs 213a-213n grouped into the third group of the third domain, and the fourth DCU 224 manages memories of the plurality of ECUs 214a-214n grouped into the fourth group of the fourth domain.

The first DCU 221 monitors a remaining capacity and available level of a memory embedded in each of the plurality of ECUs 211a to 211n, determines, when data is newly received, whether the memory of the ECU is available to store the data based on the volume of the newly received data, selects an alternative memory when it is determined that the memory is not available, and controls the selected alternative memory to store the new data.

The first DCU 221 may select at least one of a plurality of ECUs managed by other DCU in selecting the alternative memory.

The second DCU 222 monitors a remaining capacity and available level of a memory embedded in each of the plurality of ECUs 212a to 212n, determines, when data is newly received, whether the memory of the ECU is available to store the data based on the volume of the newly received data, selects an alternative memory when it is determined that the memory is not available, and controls the selected memory to store the new data.

The second DCU 222 may select at least one of a plurality of ECUs managed by other DCU in selecting the alternative memory.

The third DCU 224 also monitors a remaining capacity and available level of a memory embedded in each of the plurality of ECUs 213a to 213n, determines, when data is newly received, whether the memory of the ECU is available to store the data based on the volume of the newly received data, selects an alternative memory when it is determined that the memory is not available, and controls the selected memory to store the new data.

The third DCU 223 may select at least one of a plurality of ECUs managed by other DCU in selecting the alternative memory.

The fourth DCU 224 also monitors a remaining capacity and available level of a memory embedded in each of the plurality of ECUs 214a to 214n, determines, when data is newly received, whether the memory of the ECU is available to store the data based on the volume of the newly received data, selects an alternative memory when it is determined that the memory is not available, and controls the selected memory to store the new data.

The fourth DCU 224 may select at least one of a plurality of ECUs managed by other DCU in selecting the alternative memory.

That is, the plurality of DCUs 221 to 224 may each determine whether the memory embedded in the ECU in its domain is available to store newly received data based on the volume of the data and the remaining capacity and available level of the memory, and when it is determined that the memory of its domain is not available to store the data, select an alternative memory from among memories of a plurality of ECUs managed by other DCU.

Each of the plurality of DCUs 221 to 224 compares the volume of new data and the remaining capacity of the domain memory, and determines that the domain memory is unavailable to store the new data when the volume of the new data is larger than the remaining capacity of the domain memory.

In selecting the alternative memory, each of the plurality of DCUs 221 to 224 determines priorities of memories of a plurality of ECUs of other DCU and selects the alternative memory according to the priorities.

In determining the priorities, each of the plurality of DCUs 221 to 224 may determine the priorities based on remaining capacities and available levels of the memories of the plurality of ECUs of the other DCU.

In selecting an alternative memory, each of the plurality of DCUs 221 to 224 may select candidate memories that may substitute the domain memory based on the priorities and determine an alternative memory based on remaining capacities and available levels of the candidate memories and the importance of the data.

Each of the plurality of DCUs 221 to 224 may determine whether the available level of a memory corresponds to a warned level or a limited level based on actual usage times and maximum usage times of the memory of the ECU.

The maximum usage times may be determined by the class of the memory according to an international standard.

The international standard may be AEC-Q 100, which is an automotive semiconductor testing standard.

The maximum usage times may be a maximum read/write times.

Each of the plurality of DCUs 221 to 224 may obtain remaining capacities of memories of a plurality of ECUs, create a first lookup table based on the remaining capacities, obtain available levels based on actual usage times and maximum usage times of the memories of the plurality of ECUs, create a second lookup table based on the available levels, and select an alternative memory based on the first and second lookup tables.

Each of the plurality of DCUs 221 to 224 may also communicate directly with an external device, such as a server, a user terminal, and/or a storage medium.

Each DCU may include an ECU for managing memories of a plurality of ECUs for controlling various devices equipped in the vehicle.

A detailed structure of the DCU will be described later.

The CCU 230 is electrically, mechanically, and communicatively coupled to each of the plurality of DCUs and communicates with each of the DCUs.

Upon reception of a request to provide memory information from a DCU, the CCU 230 requests the plurality of DCUs to provide their memory information, receives the memory information from the plurality of DCUs in return, and sends the received memory information to the requesting DCU.

That is, the CCU 230 may send memory information managed by the plurality of DCUs to the other DCUs.

The CCU 230 may communicate directly with a plurality of ECUs equipped in the vehicle, communicate with an external server, and communicate with an external terminal via an interface.

The CCU 230 may communicate with the plurality of DCUs 221 to 224 over the Ethernet, communicate with the server using the antenna 119 and RF communication, and communicate with an interface using the CAN communication.

The external terminal may be a terminal for fault diagnosis, a storage medium, or a user terminal.

The user terminal may be implemented as a computer or a portable terminal that may access the vehicle over a network.

The computer may include e.g., a notebook, laptop, tablet personal computer (tablet PC), slate PC, etc., having a WEB browser installed therein, and the portable terminal may be a wireless communication device that guarantees portability and mobility, including any type of handheld based wireless communication device, such as a Personal Communication System (PCS), a Global System for Mobile communications (GSM), a Personal Digital Cellular (PDC), a Personal Handyphone System (PHS), a Personal Digital Assistant (PDA), an International Mobile Telecommunication (IMT)-2000 device, a Code Division Multiple Access (CDMA)-2000 device, a W-CDMA device, a Wireless Broadband Internet (WiBro) terminal, a smart phone, etc., and a wearable device, such as a watch, a ring, a bracelet, a necklace, glasses, a contact lens, a head mounted device (HMD), etc.

The CCU 230 may send memory management information received from the plurality of DCUs to the external server, and send new data sent from the external server to a DCU.

The new data may include update data to add a new item to one of the functions performed in the vehicle or change and/or delete an old item from the function, and upgrade data to upgrade a function.

The CCU 230 may send new data sent from the storage medium or the user terminal to a DCU.

Specifically, the CCU 230 determines a function related to new data when the new data is received, determines an ECU that controls the function, determines a DCU that manages the ECU, and sends the new data to the DCU.

The CCU 230 may include an ECU for sending and receiving information and/or data to and from the plurality of DCUs.

Control structures of the plurality of ECUs 210, DCUs 220, and the CCU 230 in the vehicle control apparatus 200 will now be described in more detail in connection with FIGS. 2 to 4.

Figure 2:
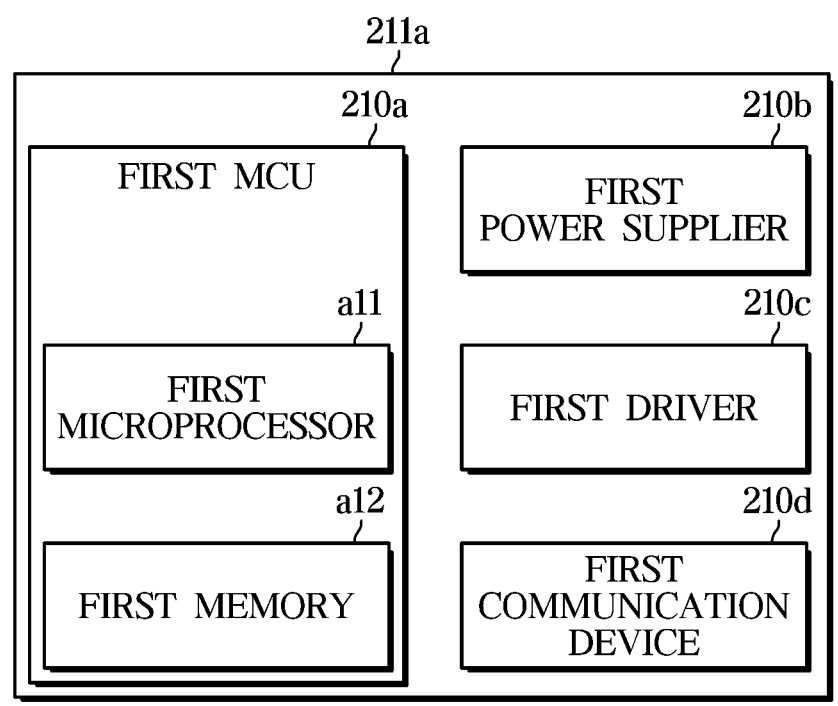
FIG. 2 is a block diagram of an electronic control unit shown in FIG. 1.
Figure 3:
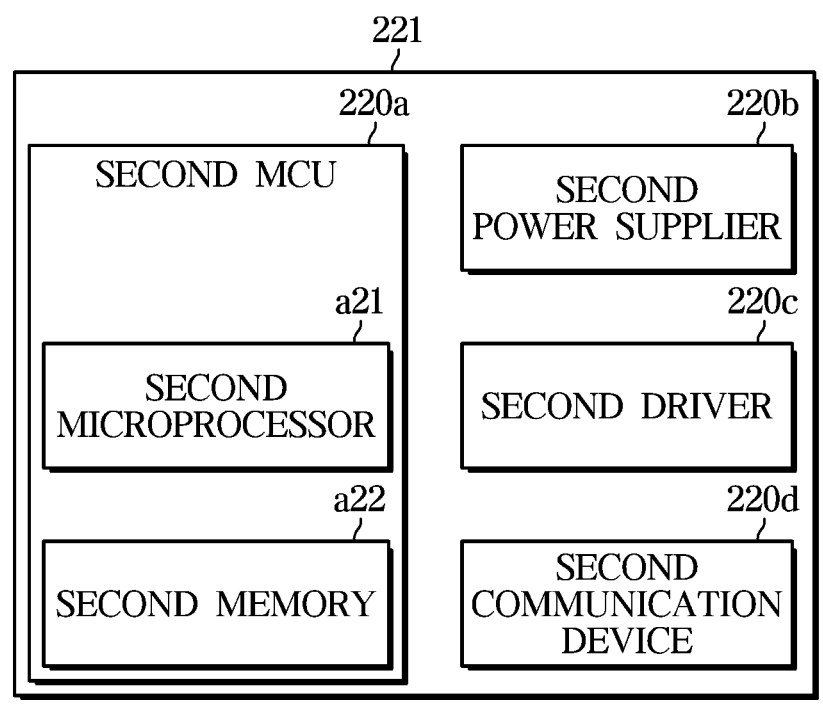
FIG. 3 is a block diagram of a domain control unit shown in FIG. 1.
Figure 4:
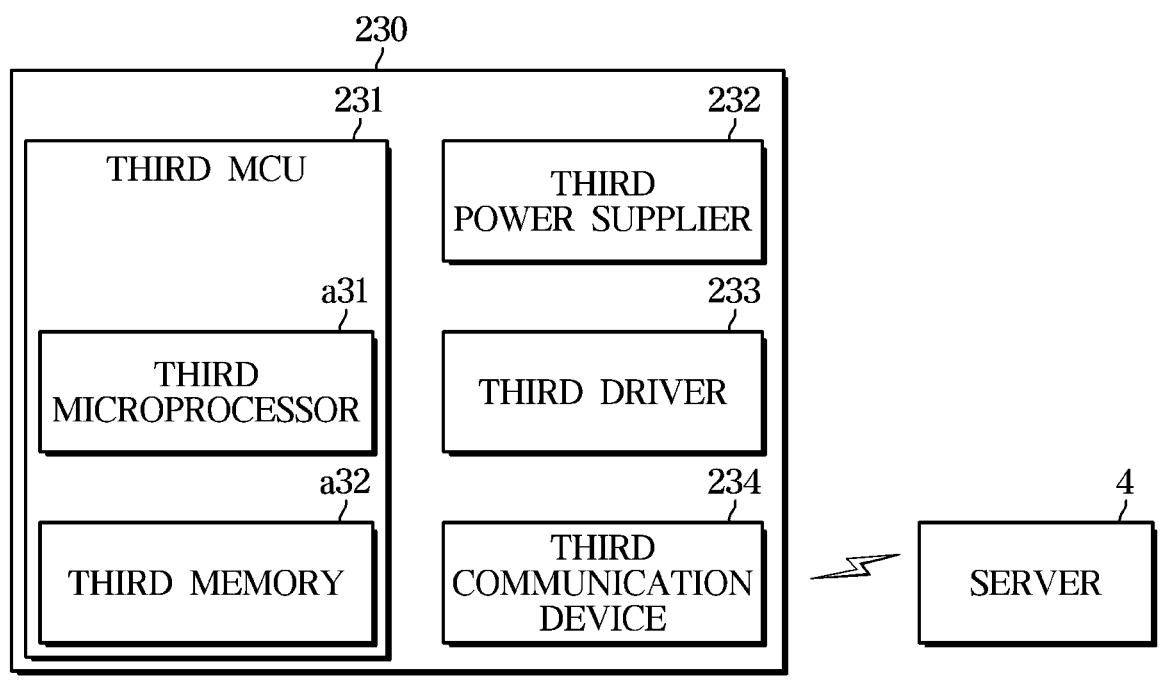
FIG. 4 is a block diagram of a connectivity control unit shown in FIG. 1.

FIG. 2 is a block diagram of an ECU shown in FIG. 1, FIG. 3 is a block diagram of a DCU shown in FIG. 1, and FIG. 4 is a block diagram of a CCU shown in FIG. 1.

A plurality of ECUs 211a to 211n, 212a to 212n, 213a to 213n, and 214a to 214n may include the same configurations but may further include extra configurations depending on a device that the ECU controls.

Common configurations shared by the plurality of ECUs will be described in connection with FIG. 2. Since the plurality of ECUs have the same configurations, the control structure of a first ECU 211a will be described as an exemplary control structure.

The first ECU 211a may be an autonomous driving control apparatus, and especially an HDA-enabled autonomous driving control apparatus, which will be described as an example.

As shown in FIG. 2, the ECU 211a may include a first micro controller unit (MCU) 210a, a first power supplier 210b, a first driver 210c, and a first communication device 210d.

The first MCU 210a may cooperate with an ECU for controlling the image acquirer, an ECU for controlling the distance detector, and an ECU for controlling the vehicle terminal by communicating with them.

The first MCU 210a receives image information, information about a distance to an obstacle, position information, map information and destination information, generates a control signal about autonomous driving based on the received information to control various devices to be driven during the autonomous driving, controls the control signal to be sent to many different devices, and controls communication with the DCU 221 and other ECU for cooperative operation.

The many different devices to be driven during the autonomous driving may include the power system, the braking system, the steering system, and the vehicle terminal for outputting navigation information and driving information.

The first MCU 210a manages an embedded memory therein, and when new data related to an autonomous driving control function is received, controls the new data to be stored in the embedded memory or to be sent and stored in a memory equipped in another ECU.

The first MCU 210a may include a first microprocessor a11 and a first memory a12.

The first microprocessor a11 generates a control signal for an autonomous driving function based on autonomous driving control software stored in the first memory a12 using the image information, the information about a distance to an obstacle, the position information, the map information, and the destination information.

The first microprocessor a11 may determine whether the vehicle is on the highway based on the position information and the map information, and when the vehicle is on the highway, perform HDA.

The first microprocessor a11 may control a first communication device 210d to obtain information of the first memory a12 and send the information of the first memory a12 to the first DCU 221 based on software for memory management stored in the first memory a12.

The information of the first memory a12 may include a total storage capacity, a data occupancy ratio, a maximum usage ratio, and a remaining capacity of the first memory a12.

In obtaining the remaining capacity of the first memory a12, the first microprocessor a11 obtains a remaining capacity of a data storage sector of the first memory a12.

A storage sector of the first memory a12 may include a software storage sector and a data storage sector.

The first memory a12 stores software for performing autonomous driving control and software for memory management.

The first memory a12 may store data for performing autonomous driving control and data for memory management.

In other words, the software storage sector of the first memory a12 may be a sector for storing the software for autonomous driving control and software for memory management.

The data storage sector of the first memory a12 may be a sector for storing data desired for autonomous driving control and memory management or a sector for storing new data.

For example, the data desired for autonomous driving control may include image data for obstacle recognition, image data for lane detection, distance data for warning of approximation to an obstacle, image data for detection of traffic lights, road signs, etc.

The first memory a12 may store new data or delete data stored therein under the control of the first microprocessor a11.

Of the information of the first memory a12, the remaining capacity may be a capacity of a sector available for additional storage of data among the data storage sector.

The first memory a12 includes a readable and writable non-volatile memory. The first memory a12 may include a flash memory.

Furthermore, the first memory a12 may be an erasable programmable read only memory (EPROM) or an electrically erasable programmable ROM (EEPROM).

The first MCU 210a may further include a volatile memory such as a random access memory (RAM).

The first MCU 210a may further include a cache, a ROM, and/or a programmable ROM (PROM).

The first power supplier 210b may regulate power supplied externally to a level for the first MCU 210a, the first driver 210c, and the first communication device 210d, and applies the regulated power to the first MCU 210a, the first driver 210c, and the first communication device 210d.

Regulating of the power may include regulating at least one of voltage and current.

The first power supplier 210b may include a regulator for regulating the voltage.

The first driver 210c operates at least one load provided outside of the first ECU based on a control signal sent from the first ECU.

The load may refer to a device that is subject to control, including the power system, the steering system, the braking system, and the vehicle terminal.

Specifically, the first driver 210c of the first ECU 210 may drive at least one of the power system, the steering system, and the braking system based on a control signal generated by the first microprocessor a11 so that the vehicle may be driven autonomously to the destination while avoiding collisions with obstacles and changing lanes based on the map information, road image information, position information, and route information.

The vehicle terminal 129 may also display an image of front, back, left and right views while in the autonomous driving mode and display map information and route guidance information in cooperation with the navigation mode.

As such, the ECU may include a microprocessor, a memory, a power supplier, a driver, and a communication device to perform operation corresponding to a device or function to be controlled.

Microprocessors of the plurality of ECUs may have different computing and control logic from one another depending on the device or function to be controlled, and memories of the plurality of ECUs may have different software and data stored therein depending on the device or function to be controlled.

Communication devices of the plurality of ECUs may have different communication schemes depending on the device to be controlled, and may have multiple communication schemes.

Furthermore, power drivers of the plurality of ECUs may have different voltage values to be regulated depending on the MCU, driver and communication device.

Drivers of the plurality of ECUs may have different hardware drives depending on the device to be controlled.

That is, depending on the devices to be controlled by the plurality of ECUs, the computing and control logic of the microprocessors, software and data stored in the memories, voltage to be regulated by the power supplier, hardware drives provided in the drivers, communication schemes of the communication devices, etc., may be different.

The microprocessors of the plurality of ECUs commonly obtain information of the memory and send the information to the DCU based on the memory management software stored in their embedded memories.

It is common for the microprocessors of the plurality of ECUs to determine whether their embedded memory are available to store data when new data is received and control the new data to be stored in the embedded memory or a memory managed by other DCU based on the determination.

The microprocessors of the plurality of ECUs may commonly use new data stored in a memory of other ECU managed by other DCU to execute computing and control logic by reading the new data from the memory.

Each of the plurality of DCU manages memories of a plurality of ECUs in the same domain managed by the DCU.

Control configurations of the plurality of DCUs may be the same. Accordingly, a control configuration of the first DCU 221 will be described as an example.

As shown in FIG. 3, the first DCU 221 may include a second MCU 220a, a second power supplier 220b, a second driver 220c, and a second communication device 220d.

Since the DCU manages memories of a plurality of ECUs grouped into the same domain, a second driver 220c may be omitted from the configuration. Accordingly, the second driver 220c will not be described hereinafter.

The second MCU 220a may exchange information with other DCU through the CCU 230.

The second MCU 220a may receive and control new data to be stored in a memory of an ECU managed by the first DCU according to the volume of the new data, or select an alternative memory and control the new data to be stored in the alternative memory when the memory of the ECU managed by the first DCU is unavailable to store the new data.

At a request to provide memory information from other DCU, the second MCU 220a may provide memory information of a plurality of ECUs managed by the first DCU to the requesting DCU.

The second MCU 220a may include a second microprocessor a21 and a second memory a22.

Upon reception of new data from the CCU 230, the second microprocessor a21 checks identification information of the new data, determines an ECU to store the new data based on the identification information, determines a remaining capacity of a memory of the ECU, determines the volume of the new data, compares the data volume and the remaining capacity of the memory, and stores the new data in the embedded memory when the volume of the new data is not greater than the remaining capacity of the memory.

When the volume of the new data is greater than the remaining capacity of the memory, the second microprocessor a21 selects an alternative memory and sends the new data for the alternative memory to store the new data.

Furthermore, even when the volume of the new data is less than the remaining capacity of the memory, if the remaining capacity of the memory corresponds to a predetermined minimum capacity, the second microprocessor a21 may select an alternative memory for memory stabilization.

When the volume of the new data is less than the remaining capacity of the memory but the usage times of the memory is equal to or greater than the maximum usage times, the second microprocessor a21 may select an alternative memory for memory stabilization.

The second microprocessor a21 selects the alternative memory based on memory information of the plurality of ECUs received from other DCU through the CCU.

The memory information may include a total storage capacity, a maximum usage ratio, a remaining capacity, actual usage times, maximum usage times, and an available level of the memory.

The available level corresponds to the lifetime of the memory, which may be determined as a ratio of the actual usage times to the maximum usage times.

Based on the software to select an alternative memory, the second microprocessor a21 may determine priorities of memories of the plurality of ECUs based on the memory information of the plurality of ECUs received from other DCU and select an alternative memory based on the remaining capacities and actual usage times of the prioritized memories of the plurality of ECUs.

The second microprocessor a21 may also select one of a plurality of DCUs based on domain information of the plurality of DCUs and send a request to provide memory information of ECUs to the selected DCU.

The second microprocessor a21 may select a DCU having an ECU to control a device related to a user convenience.

The second microprocessor a21 may determine importance of data stored in the memories of the plurality of ECUs, determine a memory storing data with low importance, determine a DCU that manages the ECU having the memory of the low-important data, and select the DCU.

The second microprocessor a21 of the first DCU having the autonomous driving control domain may determine an autonomous driving level of the vehicle and execute software for selecting an alternative memory whenever new data is received if the autonomous driving level is level 3 or higher, and not execute the software even when new data is received if the autonomous driving level corresponds to 0, 1, or 2.

The autonomous driving level may be determined by an extent to which the driver is involved in the driving and an extent to which the autonomous driving control apparatus is involved in the driving.

The autonomous driving level may also be determined according to levels of driving automation (NHTSA). The higher the autonomous driving level is, the more the vehicle performs determination for the autonomous driving control.

The second microprocessor a21 may control output of notification information indicating that the new data is stored in the alternative memory.

The second microprocessor a21 may obtain a total storage capacity, an occupancy ratio, and a maximum usage ratio of the first memory a12 of each of the plurality of ECUs 211a to 211n based on the memory management software stored in the second memory a22, and obtain the remaining capacity of the first memory a12 of each of the ECUs 211a to 211n based on the total storage capacity, the occupancy ratio, and the maximum usage ratio of the first memory a12.

The second microprocessor a21 creates the first lookup table of total storage capacities, occupancy ratios, and maximum usage ratios of the memories of the plurality of ECUs based on the memory management software.

The second microprocessor a21 determines actual usage times of the first memory a12 of each of the plurality of ECUs 211a to 211n and maximum usage times of the first memory a12 of the plurality of ECUs 211a to 211n, which is stored in the second memory a22, and determines whether the available level of the first memory a12 of each of the plurality of ECUs 211a to 211n corresponds to a warned level, a limited level, or a safe level based on the actual usage times and the maximum usage times of the first memory of each of the ECUs 211a to 211n.

The second microprocessor a21 may check whether an available level of the first memory a12 of each of the ECUs 211a to 211n belongs to the warned level or the limited level.

Based on the memory management software, the second microprocessor a21 creates the second lookup table of actual usage times of the memories of the plurality of ECUs, maximum usage times according to the memory classes, whether it is at the warned level, and whether it is at the limited level.

The second microprocessor a21 may send the first and second lookup tables to the CCU 230 upon reception of a request to provide memory information from the CCU 230.

The second memory a22 stores the software for managing memories of the plurality of ECUs.

The second memory a22 may also store the software for selecting an alternative memory.

The second memory a22 may store maximum usage times for each class of the memory of the plurality of ECUs.

The second memory a22 may also store information about the alternative memory to store new data.

The second power supplier 220b may regulate power supplied externally to a level for the second MCU 220a, the second driver 220c, and the second communication device 220d, and applies the regulated power to the second MCU 220a, the second driver 220c, and the second communication device 220d.

Regulating of the power may include at least one of voltage regulation and current regulation.

The second power supplier 220b may include a regulator for regulating the voltage.

The second communication device 220d may communicate with other DCUs via the CCU 230. The other DCUs may be second, third, and fourth DCUs.

The second communication device 220d may send a signal of the request to provide memory information of a plurality of ECUs based on a control instruction of the second MCU 220a, receive memory information of the plurality of ECUs sent from other DCU, and send the memory information of the plurality of ECUs to the second MCU 220a.

The second communication device 220d may also perform direct communication with the other DCUs.

Although the first DCU 221 is focused herein, like the first DCU 221, the second, third, and fourth DCUs may each be able to manage memories of the ECUs managed by the DCU, select an alternative memory, and provide the memory information of the ECUs to the other DCUs. Description of operation of the second, third, and fourth DCUs will not be repeated.

As shown in FIG. 4, the CCU 230 may include a third MCU 231, a third power supplier 232, a third driver 233, and a third communication device 234.

The third MCU 231 exchanges information with the plurality of DCUs and a server 4.

The third MCU 231 may include a third microprocessor a31 and a third memory a32.

The third microprocessor a31 determines identification information of new data when the new data is received, determines an ECU to which the new data is to be sent based on the identification information, determines a DCU that manages the ECU, and sends the new data to the DCU.

Upon reception of a request to provide memory information from a DCU to select an alternative memory, the third microprocessor a31 sends other DCUs the request to provide their memory information, receives the memory information from the other DCUs in return, and sends the received memory information to the requesting DCU. The memory information may be provided in the first and second lookup tables for each DCU.

When the request to provide memory information is received from a DCU to select an alternative memory with designation of a DCU from which to receive the memory information, the third microprocessor a31 sends the designated DCU the request to provide its memory information, receives the memory information from the designated DCU in return, and sends the received memory information to the requesting DCU.

The third microprocessor a31 may receive the first and second lookup tables periodically from the plurality of DCUs 221 to 224 and store the first and second lookup tables for each DCU in a third memory.

The third microprocessor a31 may receive information relating to storage of new data from the DCU. In this regard, the third microprocessor a31 sends the information relating to storage of new data to the server 4. The information relating to storage of new data may include information about whether to store the new data in the alternative memory and information about the alternative memory.

Furthermore, the information relating to storage of new data may be information notifying that there is no alternative memory to store the new data among the memories of the plurality of ECU5 of the vehicle.

The server 4 may send the vehicle at least one of update data and upgrade data related to a plurality of functions performed in the vehicle, store information deleted from a memory of at least one ECU equipped in the vehicle, store information indicating that it is impossible to store the new data, and send the information to the user terminal or send the vehicle an instruction to display the information on the display provided in the vehicle.

The third microprocessor a31 may also output the information relating to storage of new data through the display and the speaker.

The third memory a32 may store the software for managing the plurality of DCUs.

The third memory a32 may store identification information of the plurality of DCUs.

The third memory a32 may store communication information for communicating with the plurality of DCUs and the server 4.

The third power supplier 232 may regulate power supplied externally to a level for the third MCU 231, the third driver 233, and the third communication device 234, and applies the regulated power to the third MCU 231, the third driver 233, and the third communication device 234.

Regulating of the power may include at least one of voltage regulation and current regulation.

The third power supplier 232 may include a regulator for regulating the voltage.

The third driver 233 operates at least one load provided outside of the CCU based on a control signal sent from the third MCU 231.

The load may include at least one of the display and the speaker.

The third communication device 234 communicates at least one of the plurality of DCUs and the server 4 according to a control instruction from the third MCU 231.

The third communication device 234 may communicate with the server 4 through the antenna 119.

Figure 5A:
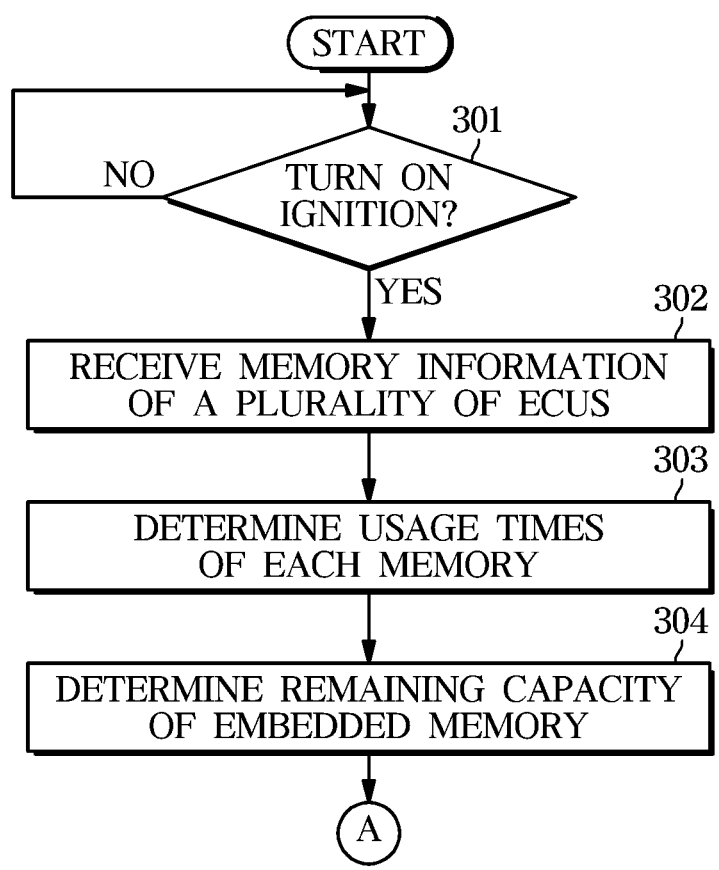
FIGS. 5A and 5B are control flow charts illustrating a memory management method of a vehicle.
Figure 5B:
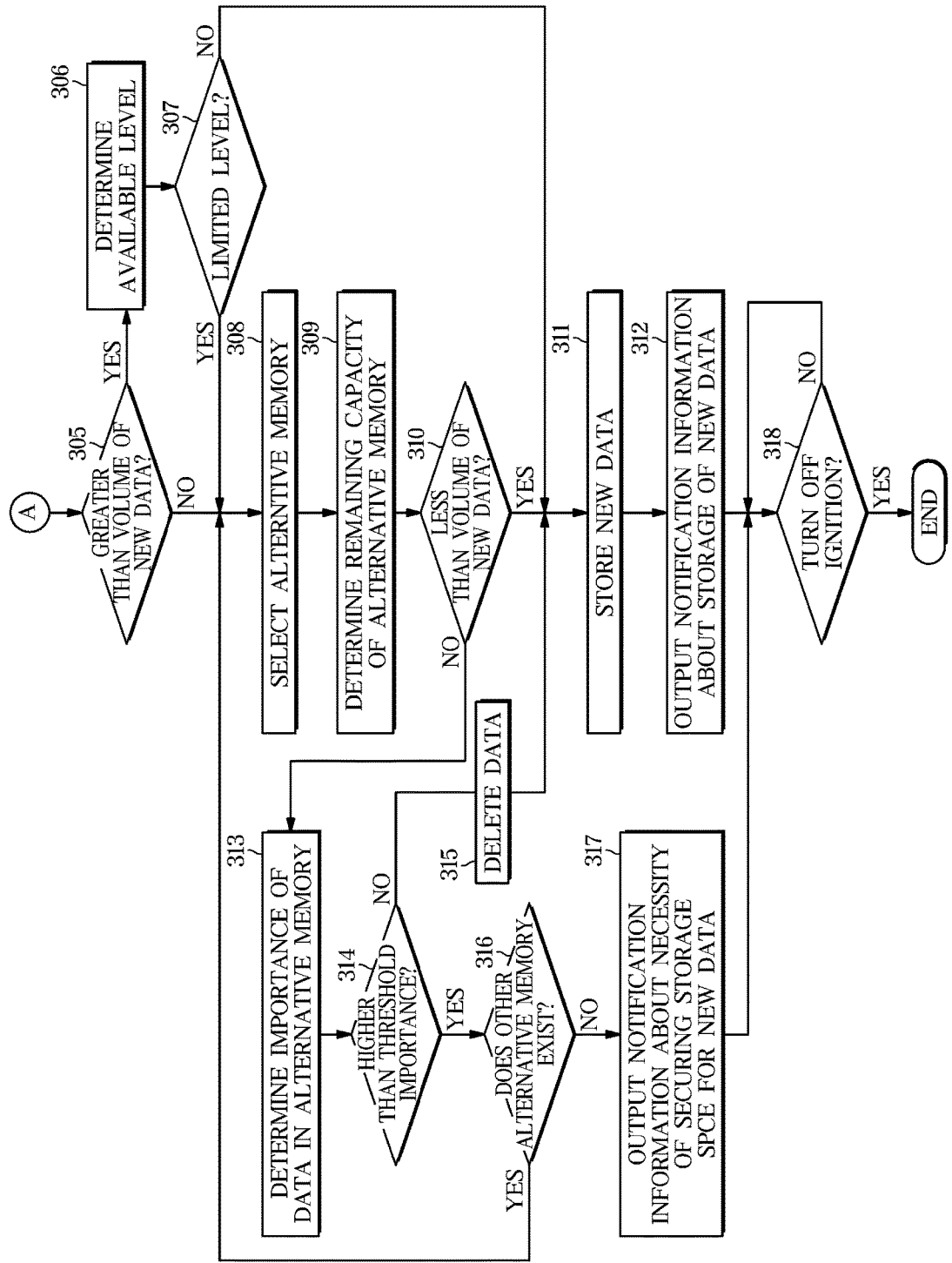

FIGS. 5A and 5B are control flow charts illustrating a memory management method of a vehicle control apparatus of a vehicle, according to an form, which will be described with reference to FIGS. 6A, 6B, 6C, 7A and 7B.

FIGS. 5A and 5B also illustrate a DCU control sequence, based on which the control configuration of the DCU and operation of the CCU and the plurality of ECUs will be described.

When the vehicle is started in 301, power is supplied to a plurality of loads, a plurality of ECUs, a plurality of DCUs, and a CCU equipped in the vehicle.

The CCU 230 of the vehicle communicates with a server to determine whether there is new data to be downloaded, and downloads the new data if it is determined that there is the new data to be downloaded.

Once the CCU 230 determines to have been connected to at least one of a user terminal and a storage medium, it determines whether there is new data to be downloaded from the at least one of the user terminal and the storage medium, and if there is the new data, downloads the new data.

Alternatively, the CCU 230 may receive and download new data from at least one of the server, the user terminal, and the storage medium without determination of the existence of new data to be downloaded.

The CCU 230 determines a function or load related to the received new data based on the identification information of the new data, determines an ECU that controls the function or load, determines a DCU that manages the ECU, and sends the new data to the DCU.

Upon reception of the new data, the DCU determines the volume of the new data in 302, determines actual usage times of the internal memory of the ECU in 303, and determines the remaining capacity of the internal memory of the ECU in 304.

Determining of the remaining capacity of the internal memory of the ECU includes sending a request for memory information to the ECU and upon reception of the memory information from the ECU, determining the remaining capacity based on the memory information.

In this regard, the microprocessor of the ECU may send a total storage capacity, an occupancy ratio, and a maximum usage ratio of the memory to the DCU.

The DCU may obtain the remaining capacity of the memory based on the total storage capacity, the occupancy ratio, and the maximum usage ratio of the memory received from the ECU.

Subsequently, the DCU checks the remaining capacity of the memory and compares the remaining capacity of the memory with the volume of the new data. The DCU determines if the remaining capacity of the memory is greater than the volume of the new data in 305.

If it is determined that the remaining capacity of the memory is equal to or greater than the volume of the new data, the DCU determines an available level of the memory corresponding to the actual usage times of the memory in 306 and determines if the available level of the memory corresponds to the limited level in 307.

Determining of an available level of a memory may include determining the maximum usage times of the memory of the ECU, and determining whether the available level corresponds to the warned level or limited level based on a ratio of the actual usage times and the maximum usage times.

For example, the DCU may determine that the available level of the memory corresponds to the warned level if the actual usage times is 80% to 90% of the maximum usage times, and determine that the available level of the memory corresponds to the limited level if the actual usage times is 90% or more of the maximum usage times.

The maximum usage times may be information stored in advance for each memory class.

The DCU may also determine the maximum usage times per class of the memory of the ECU from the lookup tables stored in the memory of the DCU. The DCU may determine a class of a memory of an ECU and determine from the lookup tables the maximum usage times corresponding to the class. The maximum usage times per class of the memory of the ECU may be determined by AEC-Q 100.

If determining that the available level of the memory is not the limited level, the DCU stores the received new data in the memory of the ECU in 311 and outputs notification information corresponding to the storage of the new data in 312.

Outputting the notification information corresponding to the storage of the new data may include sending the notification information to the server through the CCU.

Outputting the notification information corresponding to the storage of the new data may include outputting the notification information through at least one of the display and the speaker via the CCU.

Accordingly, the vehicle may let the user be aware of a change or addition of an item of a function due to the new data.

Furthermore, the DCU may store the received new data in a memory of an ECU if it is determined from a memory management setting that the available level of the memory is not the warned level.

Figure 6A:
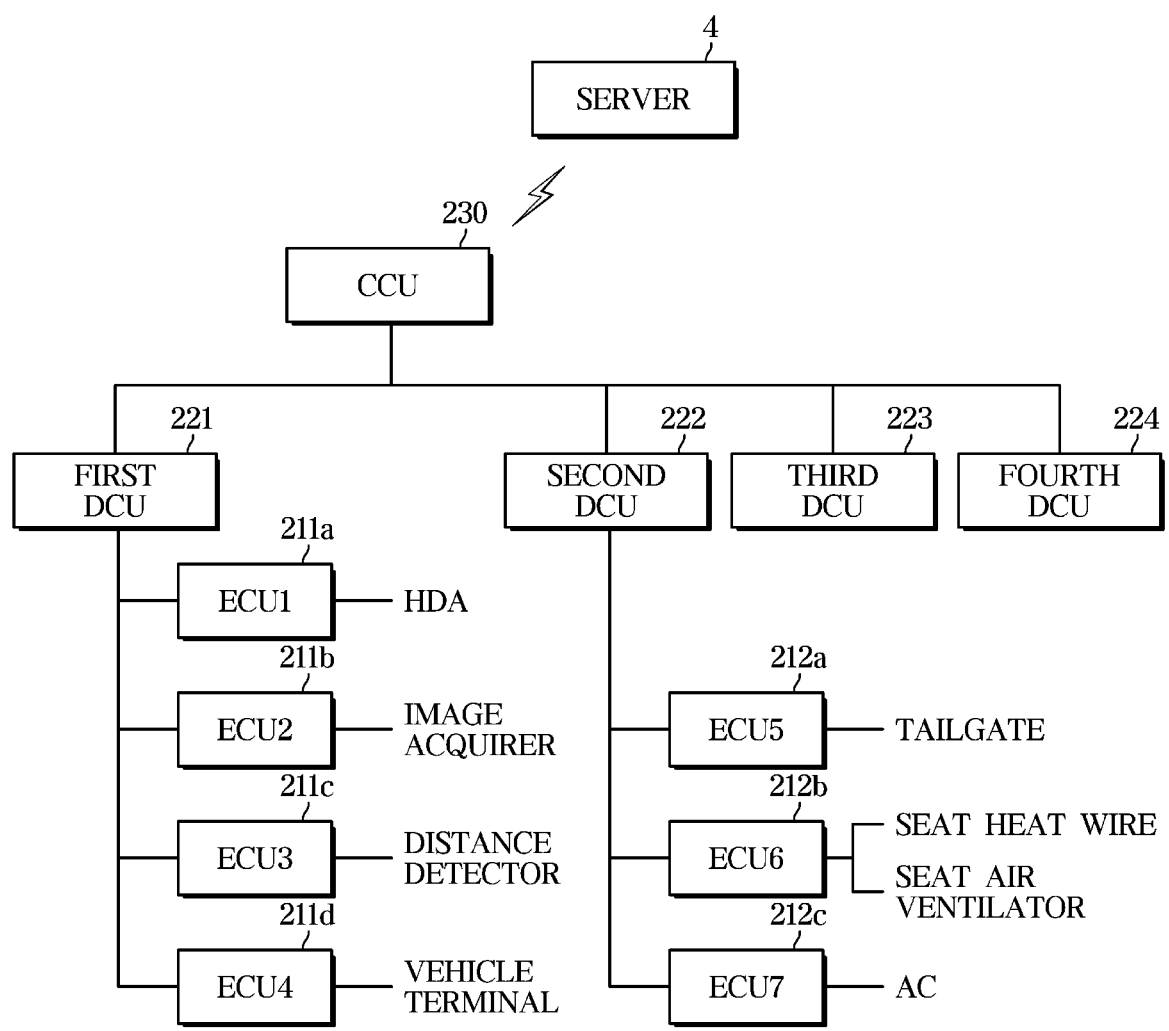
FIG. 6A shows a vehicle control apparatus.

Operations 302 to 306 will be described in connection with FIG. 6A.

Upon reception of the new data, the CCU230 determines an ECU to store the new data based on identification information of the new data. If it is determined that the new data is to add an item for HDA, the CCU 230 determines an ECU, e.g., ECU1 211a that controls HDA function, determines the first DCU 221 that manages the memory of the ECU1 211a, and sends the new data to the first DCU 221.

Upon reception of the new data, the first DCU 221 determines ECU1 211a to store the new data and checks information about the memory of ECU1 211a.

The first DCU may receive a total storage capacity, an occupancy ratio and a maximum usage ratio of the first memory of ECU1 211a from ECU1 211a, and obtain information about a remaining capacity of the first memory of ECU1 211a based on the total storage capacity, occupancy ratio and maximum usage ratio of the first memory of ECU1 211a.

The first DCU 221 may determine actual usage times of the first memory of ECU1 211a, which is stored in the second memory of the first DCU 221, if the remaining capacity of the first memory of ECU1 211a is less than the volume of the new data, determines maximum usage times corresponding to a class of the first memory of ECU1 211a, and obtain an available level of the first memory of ECU1 211a based on the actual usage times and the maximum usage times.

For example, the first DCU 221 may determine whether the available level of the first memory of ECU1 211a belongs to the warned level or the limited level based on the ratio of the actual usage times and the maximum usage times.

The first DCU 221 may determine that the available level of the first memory of ECU1 211a is a safety level if the available level does not belong to the warned level nor the limited level.

Furthermore, the first DCU 221 may create and store the first and second lookup tables of memory information of the plurality of ECUs (ECU1, ECU2, ECU3, and ECU4) by periodically managing memories of the ECUs (ECU1, ECU2, ECU3, and ECU4), and upon reception of the new data, obtain a remaining capacity and available level of a memory of an ECU to store the new data from the first and second lookup tables stored in the second memory of the first DCU.

The DCU selects an alternative memory in 308 if it is determined that the determined memory of the ECU is not available to store the new data.

The determination that the determined memory of the ECU is not available to store the new data is made when the remaining capacity of the determined memory of the ECU is less than the volume of the new data or when the available level of the determined memory of the ECU corresponds to the limited level.

The DCU requests other DCU to provide memory information of a plurality of ECUs.

The DCU may send a request to provide memory information of a plurality of ECUs managed by the other DCU to the CCU, receive memory information of the plurality of ECUs from the CCU, and select an alternative memory based on the memory information of the plurality of ECUs.

It is also possible for the DCU to select a DCU to which a request to provide memory information is to be sent based on domain information of other DCUs and send the request for information about memories of a plurality of ECUs to the selected DCU.

Exemplary software configurations of memories of the ECU and the DCU for managing the memory of the ECU will now be described.

Figure 6B:
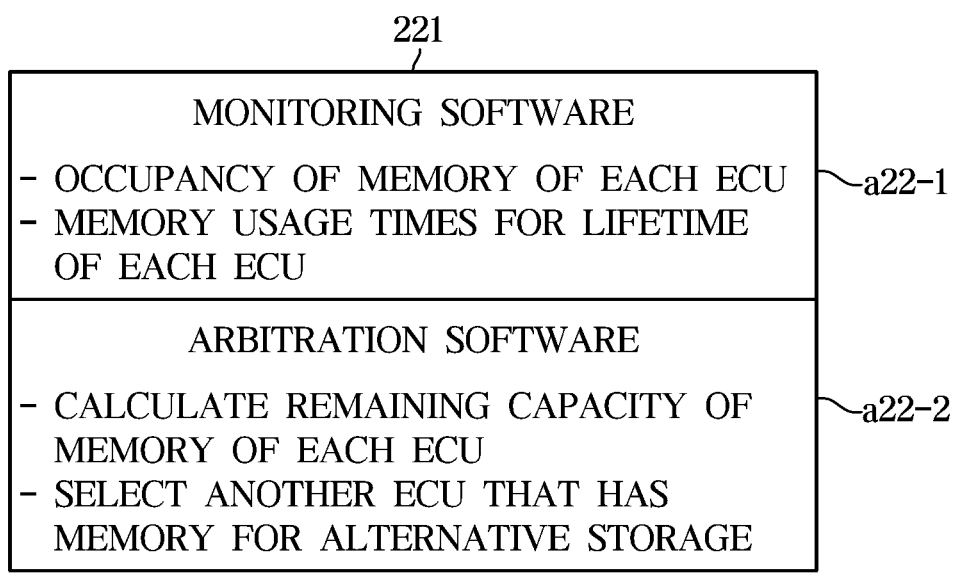
FIG. 6B is a software configuration of a memory in a DCU of a vehicle control apparatus.

Referring to FIG. 6B, the second memory of the DCU 221 may include monitoring software a22-1 for monitoring each ECU and an arbitration software a22-2 for arbitrating storage in the memory of each ECU.

The monitoring software a22-1 monitors the occupancy of a memory of each ECU and memory usage times for the lifetime of the ECU.

The arbitrating software a22-2 calculates the remaining capacity of a memory of each ECU and selects another ECU that has a memory for alternative storage.

The software stored in the memory of each DCU may be identical.

Figure 6C:
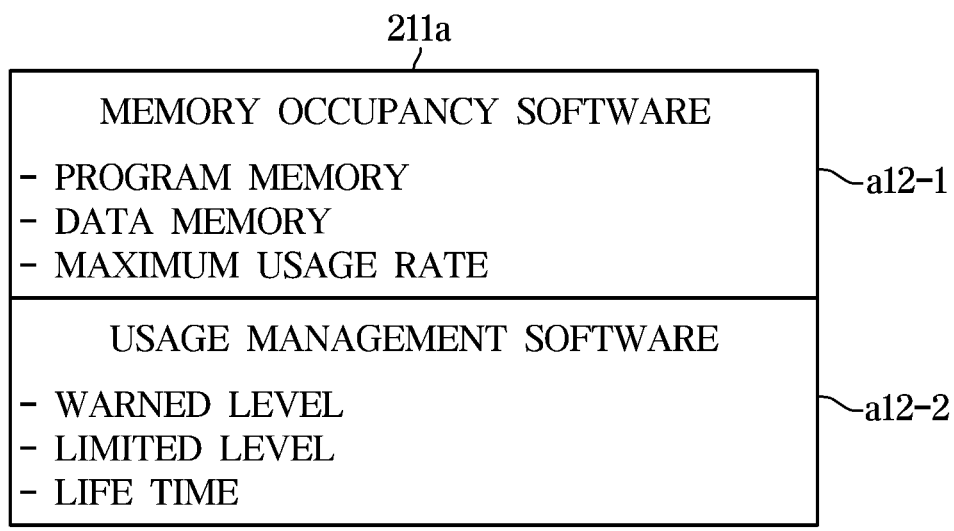
FIG. 6C is a software configuration of a memory in an ECU of a vehicle control apparatus.

Referring to FIG. 6C, the first memory of the ECU 211a may store and monitor occupancy rates of the program memory and data memory for operating the ECU, a memory occupancy software a12-1 for storing and monitoring the maximum usage rate, and a usage management software a12-2 for storing and monitoring usage times of the memory of the ECU.

The first memory of the ECU 211a may include the program memory and data memory for operating the ECU, and the memory occupancy software a12-1 may store and monitor the maximum usage rates of the program memory and the data memory.

The usage management software a12-2 may store and manage a warned level and a limited level as well as life time.

The software stored in the memory of each ECU may be identical.

Referring to FIGS. 7A and 7B, the control operation of the first DCU for storing new data and control operation of the second DCU for providing memory information will be described in detail.

The first DCU 221 requests the second, third, and fourth DCUs 222, 223 and 224 to provide memory information through the CCU 230 if it is determined that the first memory of ECU1 is not available to store the new data.

Furthermore, the first DCU 221 may determine domains of the second, third, and fourth DCUs 222, 223, and 234, determine if there is a domain related to user conveniences among the determined domains, and if it is determined that there is a domain related to user conveniences, send a request to provide memory information to the DCU that manages the domain.

Upon reception of the request to provide memory information from the first DCU to select an alternative memory, the CCU 230 sends the request to provide memory information to the second, third, and fourth DCUs 222, 223 and 224, and upon reception of the memory information from the second, third, and fourth DCUs 222, 223, and 224, sends the memory information to the first DCU 221.

Furthermore, the CCU 230 may send a request to provide memory information to a designated DCU when receiving a request for the designated DCU to provide memory information, and upon reception of the memory information from the designated DCU, send the memory information to the first DCU.

The second, third, and fourth DCUs 222, 223, and 224 send their first and second lookup tables to the CCU 230 upon reception of a request to provide memory information from the CCU 230.

The second, third, and fourth DCUs 222, 223, and 224 may each manage memories of a plurality of ECUs managed by the DCU, create the first and second lookup tables of the memories of the plurality of ECUs, and store the first and second lookup tables.

For example, in creating the first lookup table, the second DCU 222 receives memory information from the plurality of ECUs (ECU5, ECU6, and ECU7) managed by the second DCU, obtains a remaining capacity of a memory of each of the plurality of ECUs (ECU5, ECU6, and ECU7) based on the memory information including a total storage capacity, an occupancy ratio, and a maximum usage ratio, and creates the first lookup table based on the remaining capacity, the total storage capacity, the occupancy ratio, and the maximum usage ratio of the ECUs (ECU5, ECU6, and ECU7).

In creating the second lookup table, the second DCU 222 determines whether the available level of a memory of each of the plurality of ECUs (ECU5, ECU6, and ECU7) corresponds to the warned level or the limited level based on actual usage times of the memory of each of the plurality of ECUs (ECU5, ECU6, and ECU7) and maximum usage times corresponding to a class of the memory of each of the ECUs (ECU5, ECU6, and ECU7), and creates the second lookup table based on the actual usage times, the maximum usage times, and the available level of the memory of each of the ECUs (ECU5, ECU6, and ECU7).

In this case, the first DCU 221 may receive the first and second lookup tables of the memories of the plurality of ECUs (ECU5, ECU6, and ECU7) managed by the second DCU 222 from the CCU 230 and store the first and second lookup tables.

Alternatively, the first and second lookup tables of the memories of the plurality of ECUs (ECU5, ECU6, and ECU7) managed by the second DCU 222 may be created by the first DCU.

As shown in FIGS. 7A and 7B, the first DCU 221 may receive a total storage capacity, an occupancy ratio, a maximum usage ratio, actual usage times, and maximum usage times of a memory of each of the plurality of ECUs (ECU5, ECU6, and ECU7) from the second DCU 222, obtain a remaining capacity of the memory of each of the plurality of ECUs (ECU5, ECU6, and ECU7) based on the total storage capacity, occupancy ratio, maximum usage ratio, actual usage times, and maximum usage times of the memory, determine whether the available level of the memory corresponds to the warned level or the limited level based on the actual usage times and maximum usage times corresponding to a class of the memory of each of the plurality of ECUs (ECU5, ECU6, and ECU7), create the first lookup table based on the remaining capacity, the total storage capacity, the occupancy ratio, and the maximum usage ratio of the memory of each of the plurality of ECUs (ECU5, ECU6, and ECU7), and create the second lookup table based on the actual usage times, maximum usage times, and available level of the memory of each of the plurality of ECUs (ECU5, ECU6, and ECU7).

Selecting an alternative memory may include determining priorities of memories of the plurality of ECUs based on the information of the first lookup table, determining priorities of memories of the plurality of ECUs based on the information of the second lookup table, determining candidates of alternative memories based on the priorities determined based on the first and second lookup tables, and selecting a memory of an ECU with highest priority from among the candidates as an alternative memory.

The DCU determines the remaining capacity of the selected alternative memory in 309, compares the remaining capacity of the alternative memory with the volume of the new data, determines if the remaining capacity of the alternative memory is less than the volume of the new data in 310, if it is determined that the remaining capacity of the alternative memory is not less than the volume of the new data, stores the new data in the alternative memory in 311, and outputs notification information corresponding to the storage of the new data in the alternative memory in 312.

Outputting the notification information corresponding to the storage of the new data in the alternative memory may include sending the notification information to the server through the CCU.

Outputting the notification information corresponding to the storage of the new data in the alternative memory may include outputting the notification information through at least one of the display and the speaker via the CCU.

Accordingly, the vehicle may let the user be aware of a change or addition of an item of a function due to the new data.

If it is determined that the remaining capacity of the alternative memory is less than the volume of the new data, the DCU determines importance of data stored in the alternative memory in 313, and determines if the importance of the data stored in the alternative memory is higher than a threshold importance in 314.

Determining if the importance of the data stored in the alternative memory is higher than a threshold importance includes determining if the alternative memory is a memory of an ECU to control a device being operated while the vehicle is driven, and if it is determined that the alternative memory is a memory of the ECU to control a device being operated while the vehicle is driven, determining that the data stored in the alternative memory has higher importance than the threshold importance.

The device being operated while the vehicle is driven may be a device that is essentially operated for driving and braking or a device that is operated in relation to the driving safety.

If it is determined that the importance of the data stored in the alternative memory is lower than the threshold importance, the DCU deletes the data stored in the alternative memory and stores the received new data in the alternative memory in 311.

Determining that the importance of the data stored in the alternative memory is lower than the threshold importance includes determining if the alternative memory is a memory of an ECU to control a device related to user conveniences, and if it is determined that the alternative memory is a memory of the ECU to control the device related to user conveniences, determining that the data stored in the alternative memory has lower importance than the threshold importance.

The DCU outputs notification information corresponding to the storage of the new data in the alternative memory in 312 and outputs notification information relating to deletion of data from the alternative memory.

Outputting the notification information corresponding to the storage of the new data in the alternative memory and the deletion of data from the alternative memory may include sending the notification information to the server through the CCU.

Outputting the notification information corresponding to the storage of the new data in the alternative memory and the deletion of data from the alternative memory may include outputting the notification information through at least one of the display and the speaker via the CCU.

Accordingly, the vehicle may let the user be aware that an item of a function is changed or added due to the new data and that the data having been stored in the alternative memory is deleted.

The DCU may also send the data stored in the alternative memory to the server through the CCU.

If it is determined that the importance of data stored in the alternative memory is higher than the threshold importance, the DCU determines whether there is another alternative memory based on the prioritized candidates in 316, and if it is determined that there is another alternative memory, selects a candidate memory with the second priority as the alternative memory. Operations after selection of the next alternative memory are shown in 308 to 316.

If it is determined that there is no other alternative memory, the DCU determines that there is no memory to store the received new data and outputs notification information about a necessity of securing storage space for the new data.

Outputting the notification information about a necessity of securing storage space for the new data may include sending the notification information to the server through the CCU.

Outputting the notification information about a necessity of securing storage space for the new data may include outputting the notification information through at least one of the display and the speaker via the CCU.

Accordingly, the vehicle may let the user be aware of the necessity of securing storage space for the new data.

When the vehicle turns off the ignition in 318, it stops memory management of the plurality of ECUs and finally sends the notification information relating to the storage of the new data to the server.

Operation of selecting an alternative memory will be described in connection with FIGS. 7A and 7B.

The first DCU 221 determines priorities of memories of the plurality of ECUs (ECU5, ECU6, and ECU7) based on remaining capacities of the memories in the first lookup table among the first and second lookup tables having memory information of the ECUs (ECU5, ECU6, and ECU7) managed by the second DCU 222. A memory having a larger remaining capacity is assigned a higher priority.

The first DCU 221 determines priorities of memories of the plurality of ECUs (ECU5, ECU6, and ECU7) based on available levels of the memories in the second lookup table among the first and second lookup tables having memory information of the ECUs (ECU5, ECU6, and ECU7) managed by the second DCU 222. For example, if the available level of a memory does not correspond to both the warned level and limited level, but corresponds to a safety level, the memory is assigned the highest priority, and if the available level of a memory corresponds to a route level, the memory is assigned the next highest priority, and if the available level of a memory corresponds to the limited level, the memory is assigned the lowest priority, For example, the first DCU 221 assigns priority 1 to a memory of ECU5 having the largest remaining capacity among the memories of the plurality of ECUs (ECU5, ECU6, and ECU7) based on the first lookup table, priority 2 to a memory of ECU7 having the next largest remaining capacity, and priority 3 to a memory of ECU6 having the smallest remaining capacity.

If two or more ECUs have memories of the same remaining capacity, priorities may be assigned according to available levels based on the maximum usage times and actual usage times. The available level may be a ratio of an actual usage times and the maximum usage times.

If two or more ECUs have memories of the same remaining capacity, a memory of an ECU of the two ECUs to control a load or function not operated in the driving of the vehicle is assigned a higher priority, and a memory of the other ECU of the two ECUs to control a load or function that does not affect driving is assigned the next higher priority.

For example, the load or function not operated in the driving of the vehicle may include an opening/closing device of the tailgate.

The load or function not affecting the driving of the vehicle may include, for example, a seat heater, a seat ventilator, a wireless recharger, a near field communication (NFC) function.

In the form of the present disclosure, the first DCU 221 is a DCU for a domain of autonomous driving control, which may determine that there is a lot of data to be stored in the memory of ECU1, which is an autonomous driving control apparatus, and execute alternative memory selection software if the autonomous driving level of the vehicle is 3 or higher, and may not execute the alternative memory selection software if the autonomous driving level of the vehicle is less than 3.

In the following description, the case that the autonomous driving level is 3 or higher will be focused.

The first DCU 221 determines the remaining capacity of the memory of ECU5 having the highest priority, if the remaining capacity of the memory of ECU5 is equal to or larger than the volume of the new data, determines the available level of the memory of ECU5 from the second lookup table, and if the available level of the memory of ECU5 does not correspond to both the warned level or the limited level, stores the new data in the memory of ECU5.

The first DCU 221 determines the importance of data stored in the memory of ECU5 if the remaining capacity of the memory of ECU5 is less than the volume of the new data, and if the importance of the data is lower than the threshold importance, deletes the data stored in the memory of ECU5 and stores the new data in the memory. Even in this case, the first DCU may compare the remaining capacity of the memory of ECU5 and the volume of the new data after deleting the data stored in the memory of ECU5.

The first DCU 221 selects the memory of ECU7 having the next highest priority to be an alternative memory in the first lookup table if the importance of the data stored in the memory of ECU5 is higher than the threshold importance.

It is also possible for the first DCU 221 to select another alternative memory if the memory of ECU5 has already been substituted.

The first DCU 221 determines the remaining capacity of the memory of ECU7, if the remaining capacity of the memory of ECU7 is equal to or larger than the volume of the new data, determines the available level of the memory of ECU7 from the second lookup table, and if the available level of the memory of ECU5 corresponds to the limited level, determines that the memory of ECU7 is not available to store the new data and selects another alternative memory.

Furthermore, the first DCU 221 may determine whether to delete data stored in the memory of ECU7 if the available level of the memory of ECU7 corresponds to the warned level.

The first DCU determines the ECU6 having the next priority from the first lookup table, determines the remaining capacity of the memory of the ECU6, if the remaining capacity of the memory of ECU6 is equal to or larger than the volume of the new data, determines the available level of the memory of ECU6 from the second lookup table, and if the available level of the memory of ECU6 corresponds to the warned level, stores the new data in the memory of ECU6.

The first DCU may request the third and fourth DCUs to provide memory information if it is determined that the remaining capacities of the memories of the plurality of ECUs (ECU5, ECU6, and ECU7) are all smaller than the volume of the new data, and output notification information relating to securing a memory for the new data if the first and second lookup tables provide information about memories of a plurality of ECUs managed by the third and fourth DCUs.

Furthermore, it is also possible for the first DCU to select one of the memories of the ECUs (ECU2, ECU3, and ECU4) managed by the first DCU to be an alternative memory if the memory of ECU1 is not available to store the new data.

According to forms of the present disclosure, an impossibility of storing big data greater than a storage capacity of a memory due to separate control and management of an ECU over its internal memory (except for data sectors and program sectors having functions) may be made possible.

According to forms of the present disclosure, a loss of important information of a vehicle may be prevented by organizing DCUs that performs centralized control over the ECUs based on an architecture which integrates control functions and integrally controlling and managing memories of the plurality of ECUs through the organized DCUs.

Furthermore, according to forms of the present disclosure, control performance of autonomous driving and user safety may be improved by responding to a change in control performance of autonomous driving because a memory for storing and managing data affecting the driver's safety, which is provided after the vehicle is sold, may be secured.

As such, the present disclosure may increase the quality and marketability of the vehicle or terminal that performs an autonomous driving mode, and may further increase satisfaction of the user, thereby securing product competitiveness.

Several forms have been described above, but a person of ordinary skill in the art will understand and appreciate that various modifications can be made without departing the scope of the present disclosure. Thus, it will be apparent to those ordinary skilled in the art that the true scope of technical protection is only defined by the following claims.

What is claimed is:

1. An autonomous driving control apparatus, comprising:
   a plurality of electronic control units (ECUs) respectively coupled to a plurality of devices, where each ECU of the plurality of ECUs is configured to control operation of a corresponding device of the plurality of devices; and
   a domain control unit (DCU) configured to:
      communicate with the plurality of ECUs and an external device,
      receive remaining capacities and available levels of memories of the plurality of ECUs, and information of currently used memories among the memories to control the operation of the plurality of devices, and
      determine priorities of the memories of the plurality of ECUs based on the remaining capacities and available levels of the memories, and the information of the currently used memories,
   wherein each ECU of the plurality of ECUs comprises:
      a memory configured to store data and software for autonomous driving, and
      a processor configured to generate a control signal to control operation of the corresponding device of the plurality of devices based on the stored data and software,
   wherein when new data is received from the external device, the DCU is configured to:
      select a first ECU of the plurality of ECUs to store the new data, and
      determine whether the first ECU is available to store the new data based on at least one of a remaining capacity of a memory of the first ECU or an available level of the memory of the first ECU, and
   wherein when the first ECU is unavailable to store the new data, the DCU is configured to:
      select a memory of a second ECU of the plurality of ECUs based on the determined priorities, and
      store the new data in the memory of the second ECU of the plurality of ECUs.

2. The autonomous driving control apparatus of claim 1, wherein when the remaining capacity of the memory of the first ECU is equal to or greater than a volume of the new data and the available level of the memory of the first ECU is not a limited level, the DCU is configured to control the new data to be stored in the memory of the first ECU.

3. The autonomous driving control apparatus of claim 1, wherein when the remaining capacity of the memory of the first ECU is less than a volume of the new data, the DCU is configured to control selection of a memory of other ECUs of the plurality of ECUs, and when the available level of the memory of the first ECU is a limited level, the DCU is configured to control selection of a memory of other ECUs of the plurality of ECUs.

4. A vehicle, comprising:
   a plurality of electronic control units (ECUs) configured to control a plurality of devices and functions thereof;
   a plurality of domain control units (DCUs) configured to manage the plurality of ECUs; and
   a connectivity control unit (CCU) configured to communicate with the plurality of DCUs and an external device, and further configured to determine a function related to new data upon receipt of the new data from the external device,
   wherein ECUs of the plurality of ECUs are grouped into a plurality of ECU groups based on a domain, and ECU groups of the plurality of ECU groups are respectively controlled by assigned DCUs among the plurality of DCUs, and
   wherein each ECU of the plurality of ECUs comprises:
      a memory configured to store data and software, and
      a processor configured to generate a control signal to control a device or a function based on the stored data and software,
   wherein the CCU is configured to:
      among the assigned DCUs, determine a first DCU assigned to a first group of ECUs, among the ECUs groups, based on the determined function of the new data to store the new data, and
      send the new data to the first DCU configured to manage a first ECU in the first group of ECUs,
   wherein the first DCU is configured to receive the new data and determine whether the first ECU is available to store the new data based on at least one of a remaining capacity of a memory of the first ECU or an available level of the memory of the first ECU, and
   wherein when the first ECU is unavailable to store the new data, the first DCU is configured to select a memory of a second ECU in a second group of ECUs among the ECU groups which is managed by a second DCU, and store the new data in the memory of the second ECU.

5. The vehicle of claim 4, wherein when the remaining capacity of the memory of the first ECU is equal to or greater than a volume of the new data and the available level of the memory of the first ECU is not a limited level, the first DCU is configured to control the new data to be stored in the memory of the first ECU.

6. The vehicle of claim 4, wherein when the available level of the memory of the first ECU is a limited level, the first DCU is configured to control selection of a memory of other ECUs in the first group of ECUs.

7. The vehicle of claim 4, wherein the plurality of DCUs are configured to send remaining capacities and available levels of memories of the plurality of ECUs to the CCU when receiving a request to provide memory information from the CCU.

8. The vehicle of claim 7, wherein the first DCU is configured to:
receive the remaining capacities and available levels of memories of the plurality of ECUs respectively managed by corresponding DCUs of the plurality of DCUs,
determine priorities of the memories of the plurality of ECUs based on the remaining capacities and available levels of the memories of the plurality of ECUs, and
select the memory of the second ECU based on the priorities.

9. The vehicle of claim 8, wherein the first DCU is configured to delete data stored in the memory of the second ECU when an importance of the data stored in the memory of the second ECU is lower than a threshold importance.

10. The vehicle of claim 9, wherein the CCU is configured to send at least one of information about storage of the new data, information about the memory of the second ECU, or information about deletion of the data stored in the memory of the second ECU to the external device.

11. The vehicle of claim 4, wherein the first DCU is configured to:
receive a total storage capacity, an occupancy ratio, and a maximum usage ratio of the memory of the first ECU from the first ECU, and
obtain the remaining capacity of the memory of the first ECU based on the total storage capacity, the occupancy ratio, and the maximum usage ratio of the memory of the first ECU.

12. The vehicle of claim 4, wherein each DCU of the plurality of DCUs is configured to:
determine maximum usage times of each memory of the plurality of ECUs based on maximum usage times for each class stored in each memory of the plurality of ECUs,
determine actual usage times of each memory of the plurality of ECUs, and
obtain an available level of each memory of the plurality of ECUs based on the maximum usage times and the actual usage times of each memory of the plurality of ECUs.

13. The vehicle of claim 4, wherein each DCU of the plurality of DCUs is configured to:
generate and store a first lookup table having a total storage capacity, an occupancy ratio, a maximum usage ratio, and a remaining capacity of each memory of the plurality of ECUs, and
generate and store a second lookup table having maximum usage times, actual usage times, and an available level of each memory of the plurality of ECUs.

14. The vehicle of claim 13, wherein another DCU of the plurality of DCUs is configured to send the first lookup table and the second lookup table to the first DCU or the second DCU receiving the new data through the CCU.

15. The vehicle of claim 4, wherein the plurality of DCUs is configured to
manage at least one ECU of the plurality of ECUs which is configured to control a user-convenient function and a user-convenient device.

* * * * *